(12) United States Patent
Atchison et al.

(10) Patent No.: US 10,015,929 B1
(45) Date of Patent: Jul. 10, 2018

(54) COMBINE HARVESTER SICKLE SAFETY GUARD APPARATUS AND STORAGE UNIT FOR SAME

(71) Applicants: Ryan Atchison, Chico, CA (US); Jeff Atchison, Chico, CA (US)

(72) Inventors: Ryan Atchison, Chico, CA (US); Jeff Atchison, Chico, CA (US)

( * ) Notice: Subject to any disclaimer, the term of this patent is extended or adjusted under 35 U.S.C. 154(b) by 351 days.

(21) Appl. No.: 14/791,899

(22) Filed: Jul. 6, 2015

(51) Int. Cl.
| | |
|---|---|
| *A01D 82/00* | (2006.01) |
| *A01D 75/18* | (2006.01) |
| *A01D 34/04* | (2006.01) |
| *A01D 34/00* | (2006.01) |

(52) U.S. Cl.
CPC .......... *A01D 75/18* (2013.01); *A01D 34/001* (2013.01); *A01D 34/04* (2013.01)

(58) Field of Classification Search
CPC ...... A01D 75/18; A01D 75/20; A01D 34/001; A01D 34/04
USPC .............. 56/1, 259, 275, 298, 307, DIG. 20, 56/DIG. 24
See application file for complete search history.

(56) References Cited

U.S. PATENT DOCUMENTS

| | | | | |
|---|---|---|---|---|
| 209,465 | A | | 10/1878 | Curtis |
| 1,453,753 | A | * | 5/1923 | Converse ............... A01D 75/20 280/160 |
| 1,557,920 | A | * | 10/1925 | Budroe ................. A01D 75/18 206/349 |
| 2,619,787 | A | | 12/1952 | Mills |
| 2,971,317 | A | * | 2/1961 | Johnston ................ A01D 75/20 56/296 |
| 3,399,519 | A | * | 9/1968 | Buchanan .............. A01D 34/73 56/295 |
| 3,611,687 | A | * | 10/1971 | Walker .................... A01D 75/10 56/1 |
| 4,015,408 | A | * | 4/1977 | Cornellier ............ A01D 34/828 56/17.4 |
| 4,673,196 | A | | 6/1987 | Hall |

(Continued)

FOREIGN PATENT DOCUMENTS

| | | | | |
|---|---|---|---|---|
| DE | 2828999 | * | 1/1980 | ............. A01D 75/18 |
| GB | 865904 | * | 4/1961 | ............. A01D 75/18 |

*Primary Examiner* — Thomas B Will
*Assistant Examiner* — Mai T Nguyen
(74) *Attorney, Agent, or Firm* — Dennis A. DeBoo; Audrey A. Millemann; Weintraub Tobin

(57) ABSTRACT

Sickle safety guard apparatus comprising an elongated rib laterally bifurcating into a pair of spaced apart longitudinally and laterally extending side wall portions respectively transitioning into a pair of distal, longitudinally and laterally extending, sides wall portions forming a longitudinally and laterally inwardly extending receiving gap between the side wall portions that decreases in separation laterally inwardly for forming respective guiding surfaces laterally inwardly followed by respective pressure surfaces of the side wall portions defining a longitudinally and laterally extending slot therebetween and the respective pressure surfaces radially inwardly increasing in separation to interior terminating ends wherein sickle teeth are received and guided by the guiding surfaces into said longitudinally and laterally extending slot and into abutment with the pressure surfaces while biasing apart the pair of biasing/pressure surfaces for providing a pressure fit between the biasing/pressure surfaces and the sickle teeth.

20 Claims, 10 Drawing Sheets

(56) References Cited

U.S. PATENT DOCUMENTS

| | | | | |
|---|---|---|---|---|
| 5,271,156 A | * | 12/1993 | Hult | A01D 75/18 |
| | | | | 144/34.1 |
| 6,240,662 B1 | | 6/2001 | Borowiak | |
| 8,607,481 B1 | * | 12/2013 | Lukasko | E01H 5/066 |
| | | | | 37/232 |
| 8,782,930 B2 | * | 7/2014 | Thomas | E01H 5/066 |
| | | | | 37/266 |
| 2012/0255339 A1 | | 10/2012 | Moxlow | |
| 2013/0145658 A1 | | 6/2013 | Tordik | |

* cited by examiner

COMBINE HARVESTER SICKLE SAFETY GUARD APPARATUS AND STORAGE UNIT FOR SAME

FIELD OF THE INVENTION

This invention relates generally to safety guards and, in particular, to a combine harvester sickle safety guard apparatus and optional storage unit for same. In one embodiment, the harvester sickle safety guard apparatus is employed for, but not limited to, protecting people from being harmed by the injuriously sharp sickle teeth of the harvester sickle and inhibiting equipment from damaging or being damaged by the sharp sickle teeth of the sickle.

BACKGROUND OF THE INVENTION

Conventional combines, including rice combines, are generally provided with a reel for gathering a standing crop into a mouth of the combine and a cutter assembly mounted under the reel. In one form, this cutter assembly comprises a single sickle bar having a multiplicity of longitudinally spaced cutting teeth or blades disposed along the longitudinal length of the sickle bar for cutting stalks of grain. The teeth of the single sickle bar are matched with rigid and sharp stationary fingers of a guard bar which extends forward somewhat beyond the forward end of the sickle teeth. The rigid and sharp stationary fingers hold the grain stalks for cutting by the sickle teeth and because of their rigidity, the fingers also provide some protection by preventing objects, particularly larger objects, from reaching some portions of the teeth of the sickle bar.

This single sickle and rigid and sharp stationary finger cutting arrangement provides good speed and efficiency when cutting standing grain, including rice. However, the use of this cutting arrangement in harvesting of down rice and other troublesome crops presents difficulties.

For example, is often necessary to harvest rice under wet field conditions frequently due to heavy wind and rain wherein the rice has been bent or broken generally defining wet fallen rice or "down" rice that tends to be ineffectively cut by the combination of the single sickle and rigid and sharp stationary finger cutting arrangement thereby resulting in a poor recovery rate and an unreasonable speed of harvesting. The speed of harvesting is especially important because in such circumstances the conditions of the crop are likely to be deteriorating while the harvest is under way. Thus, the faster harvesting can be accomplished the greater the amount of the crop that can be saved.

Currently, an improved two cutting bar arrangement device is utilized in place of the single sickle and rigid and sharp stationary finger cutting arrangement. This two cutting bar arrangement device utilizes two cutting bars, one of which reciprocates in close contact with the other, providing a scissors-like cutting action from dozens of blade pairs distributed the full width of the reaper assembly of the combine. This two cutting bar arrangement, one of which reciprocates in close contact with the other, has shown to eliminate the above noted feeding problems by providing clean and even cutting even in the most adverse conditions as noted above. Additionally, the cutter bar blades are sharp and preferably serrated to produce a highly effective scissors or shearing action.

As a result, these sharp and preferably serrated blades engender a multiplicity of safety hazards and although the sharp and preferably serrated blades are unprotected by fingers, the physical arrangement is such that a broken or damaged blade may be easily replaced, but with extreme caution for safety.

Accordingly, these sharp and preferably serrated blades engender a multiplicity of safety hazards resulting in a need to ameliorate or overcome one or more of these engendered safety hazards.

BRIEF SUMMARY OF THE INVENTION

Accordingly, and in one aspect, an embodiment of the invention ameliorates or overcomes one or more of the engendered safety hazards of a combine harvester sickle comprising one or more sickle bars with sickle teeth by providing a combine harvester sickle safety guard apparatus for, but not limited to, protecting people working on or near the combine harvester sickle from being harmed by the injuriously sharp sickle teeth and inhibiting equipment from damaging or being damaged by the sharp sickle teeth of the combine harvester sickle.

In another aspect, an embodiment of the combine harvester sickle safety guard apparatus comprises an elongated rib laterally bifurcating into a pair of spaced apart longitudinally and laterally extending side wall portions that respectively transition into a pair of distal, longitudinally and laterally extending, incurvate side wall portions forming a longitudinally and laterally inwardly extending receiving gap between the incurvate side wall portions. The receiving gap decreases in separation laterally inwardly for forming respective guiding surfaces laterally inwardly followed by respective pressure surfaces of the incurvate side wall portions defining a longitudinally and laterally extending slot therebetween and the respective pressure surfaces radially inwardly increasing in separation to interior terminating ends. Sickle teeth of the combine harvester sickle are received and guided by the guiding surfaces into said longitudinally and laterally extending slot and into abutment with the pressure surfaces while biasing apart the pair of pressure surfaces for providing a pressure fit between the pressure surfaces and sickle teeth.

In another aspect, an embodiment of the combine harvester sickle safety guard apparatus has a generally longitudinal oblong shape having a substantially uninterrupted longitudinal, lateral, and vertical cross sectional area.

In another aspect, an embodiment of the combine harvester sickle safety guard apparatus comprises a plurality of symmetrical anchors or ears disposed on a longitudinal exterior lower surface of the combine harvester sickle safety guard apparatus wherein each of said plurality of anchors comprises a central hole extending there through wherein the anchor is used to tether form either direction, directly back to the header or aground front of the combine harvester sickle safety guard apparatus In another aspect, an embodiment of the combine harvester sickle safety guard apparatus comprises a means for storing a plurality of the combine harvester sickle safety guards in an array formed by a pair of spaced apart harvester sickle safety guard apparatus storage units having spaced apart complementary shaped holding channels therein.

In a further aspect, an embodiment of the combine harvester sickle safety guard apparatus comprises an elongated rib laterally bifurcating into a pair of spaced apart longitudinally and laterally extending side wall portions comprising a first side wall portion and a second generally planner side wall portion, said first side wall portion respectively transitions into a distal, longitudinally and laterally extending, incurvate side wall portion forming a longitudinally and laterally inwardly extending receiving gap between the incurvate side wall portion and the generally planner side wall portion wherein the receiving gap decreases in separation laterally inwardly for forming respective guiding surfaces laterally inwardly followed by respective pressure surfaces of the incurvate side wall portion and generally planner side wall portion defining a longitudinally and laterally extending slot between the two sidewall portions and the respective pressure surfaces radially inwardly increasing in separation to respective interior terminating ends. Sickle teeth of the combine harvester sickle are received and guided by the guiding surfaces into the longitudinally and laterally extending slot and into abutment with the pressure surfaces while biasing apart the pressure surfaces for providing a pressure fit between the pressure surfaces and sickle teeth.

Accordingly, it should be apparent that numerous modifications and adaptations may be resorted to without departing from the scope and fair meaning of the claims as set forth herein below following the detailed description of the invention.

DETAILED DESCRIPTION OF THE INVENTION

Figure 1:
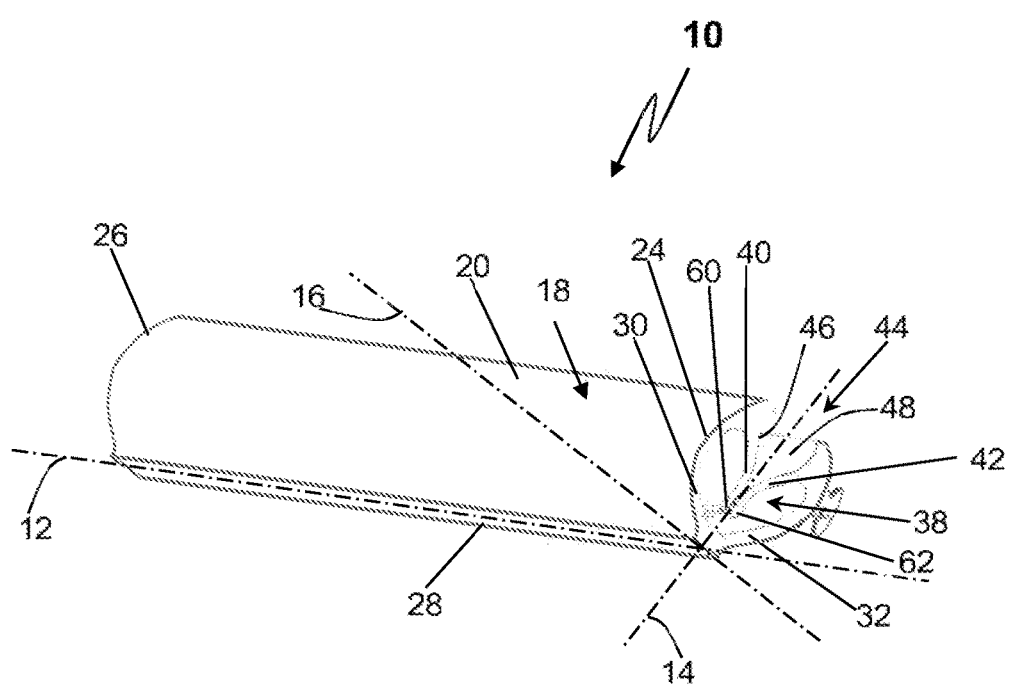
FIG. 1 is a forward end and longitudinal upper side perspective view of an embodiment of a combine harvester sickle safety guard apparatus.

Considering the drawings, wherein like reference numerals denote like parts throughout the various drawing figures, reference numeral 10 is directed to an embodiment of a combine harvester sickle safety guard apparatus and reference numeral 100 is directed to an embodiment of a storage unit assembly for said combine harvester sickle safety guard apparatus 10.

Axis

Referring to FIG. 1, a set of three mutually perpendicular or orthogonal coordinate axes is defined for the combine harvester sickle safety guard apparatus 10 as comprising a longitudinal axis 12, a traverse or lateral axis 14, and a vertical axis 16.

Longitudinally Extending Body

Figure 2:
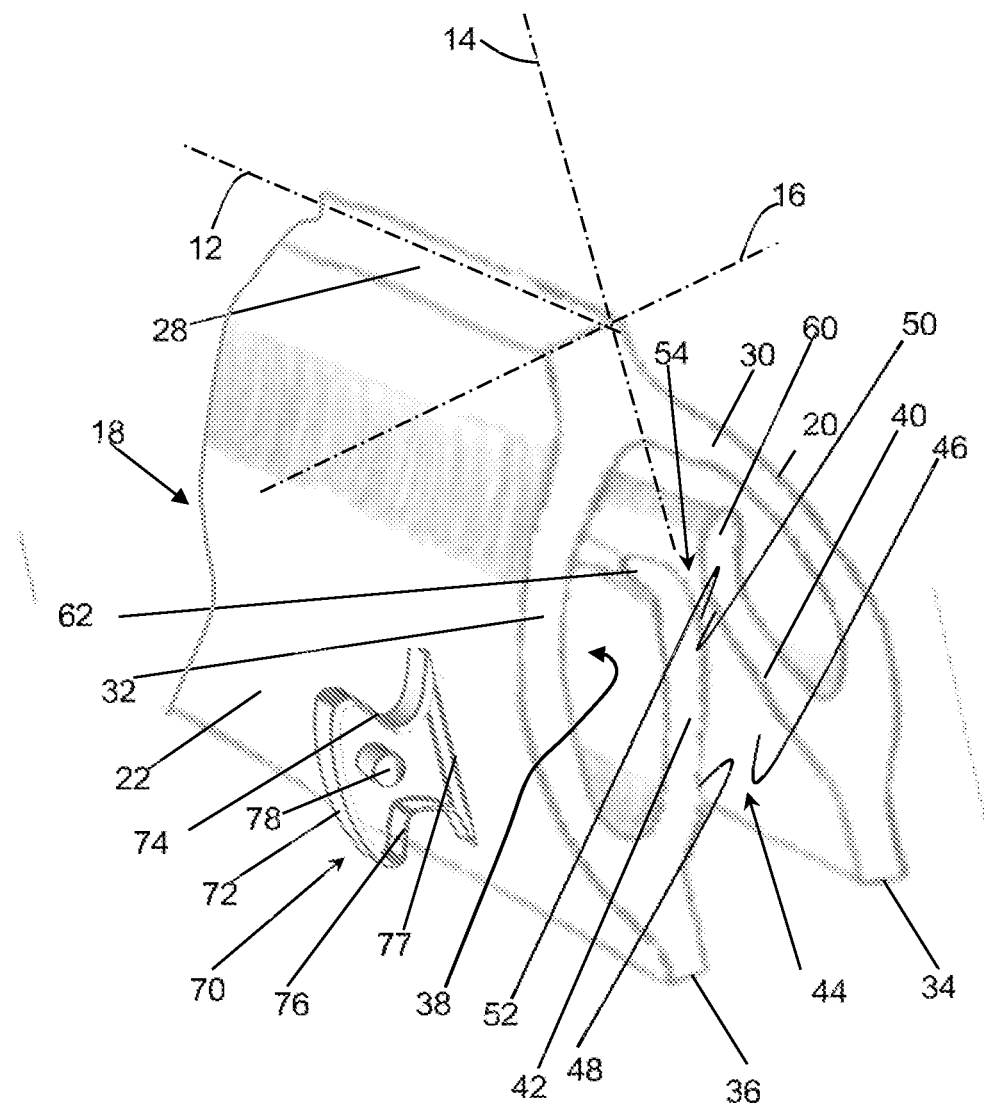
FIG. 2 is a forward end and longitudinal underside fragmented perspective view of an embodiment of the combine harvester sickle safety guard apparatus.

Referring to FIGS. 1 and 2, an embodiment of the combine harvester sickle safety guard apparatus 10 comprises a longitudinally extending body 18 having, but not limited to, a generally oblong shape. Longitudinally extending body 18 is comprised of an exterior vertically arcuately outwardly extending upper surface 20 and lower surface 22 longitudinally extending between a first or forward end 24 and a second or reward end 26 longitudinally spaced from the first end 24.

Longitudinally extending body 18 further comprises a longitudinally extending forward most or anterior rib 28 laterally bifurcating into a pair of spaced apart longitudinally and laterally extending side wall portions 30, 32.

In turn, side wall portions 30, 32 respectively distally transition into a pair of longitudinally and laterally extending incurvate side wall portions 40, 42 that transition into a pair of interior terminating ends 60, 62.

The incurvate side wall portions 40, 42 forming a longitudinally and laterally inwardly extending receiving gap 44 between the incurvate sides wall portions 40, 42.

As illustrated in FIG. 2, the side wall portions 40, 42 decrease in vertical separation laterally inwardly back toward rib 28 and thus the gap 44 decreases when traversing along the lateral axis back toward rib 28 for forming respective opposing guiding surfaces 46, 48 laterally inwardly followed by respective opposing pressure surfaces 50, 52 of the incurvate side wall portions 40, 42 defining a longitudinally and laterally extending slot 54 therebetween.

Pressure surfaces 50, 52 arcuately transition from the guiding surfaces 46, 48 and comprise a short generally parallel run followed by a vertically outwardly increasing separation to interior terminating rounded ends 60, 62 disposed within an interior channel 38.

Back Ribs

The transition of side wall portions 30, 32 to incurvate side wall portions 40, 42 comprises respective spaced apart laterally reward and longitudinally extending back ribs 34, 36 having respective rearmost surfaces generally rectangular in shape.

Anchors

Figure 3:
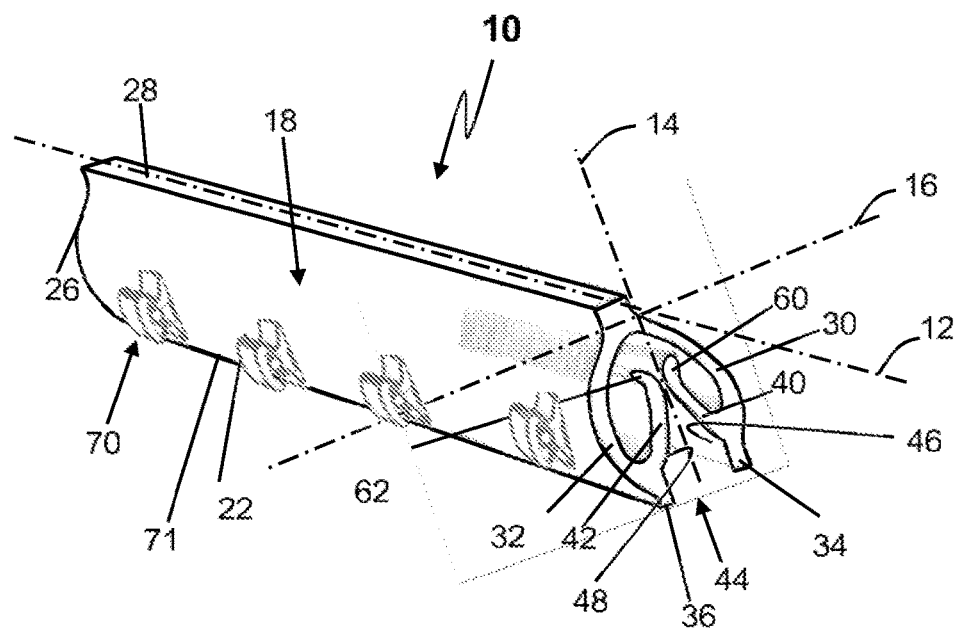
FIG. 3 is a forward end and longitudinal underside perspective view of an embodiment of the combine harvester sickle safety guard apparatus.

Referring to FIG. 3, the combine harvester sickle safety guard apparatus 10 further comprises a plurality of symmetrical ears or anchors 70 longitudinally spaced apart and disposed adjacent a posterior edge 72 of the lower surface 22 of the longitudinally extending body 18.

Figure 12:
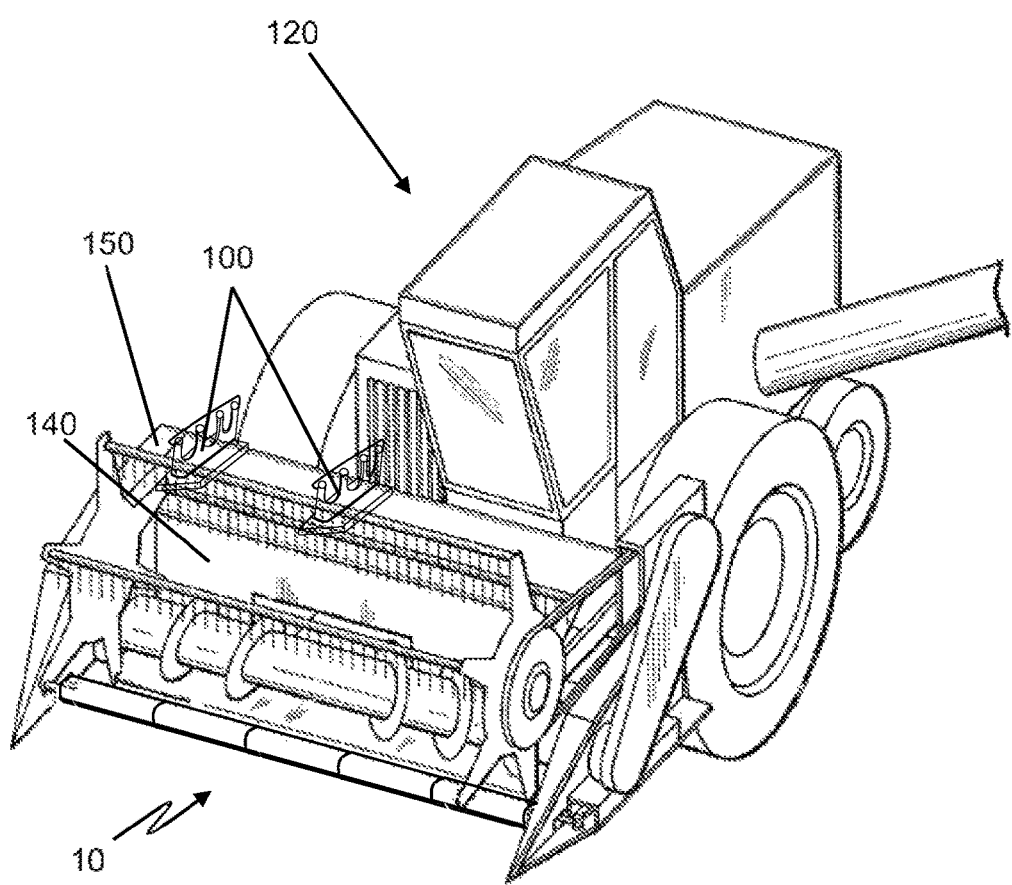
FIG. 12 is a simplified perspective view of an embodiment of a plurality of combine harvester sickle safety guards operatively coupled over the entire length of the sickle of the combine harvester.
Figure 13:
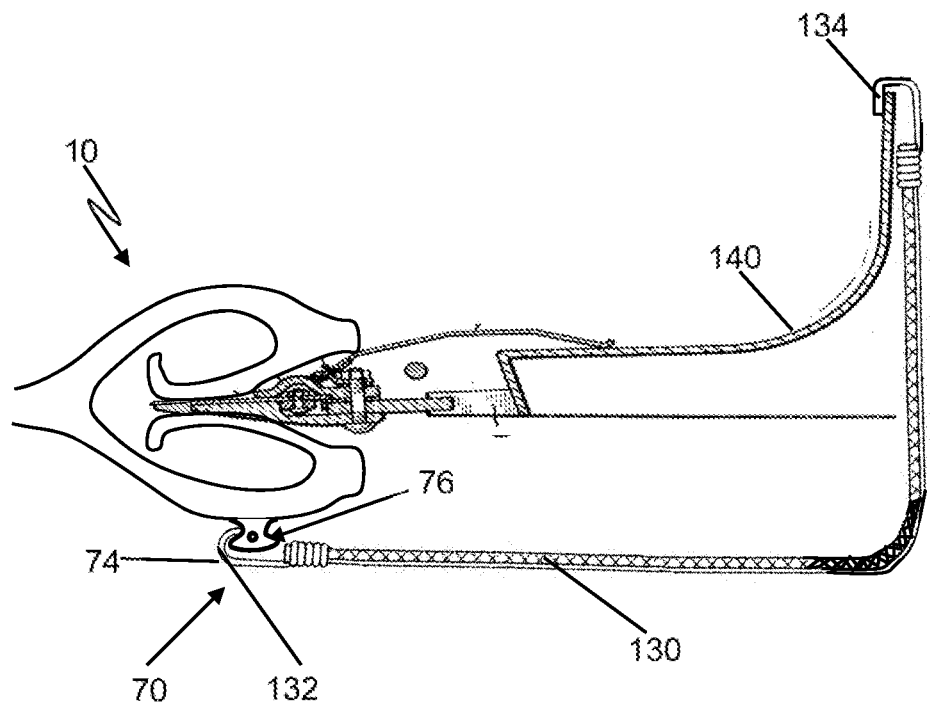
FIG. 13 is a forward end elevational view of an embodiment of the combine harvester sickle safety guard apparatus operatively coupled to the sickle of the combine harvester and secured with a securing strap tethered between an ear or anchor on the combine harvester sickle safety guard apparatus and a guard plate of the combine harvester.

The symmetrical ears or anchors 70 serve to provide means for capturing one end 132 of a tethering device 130 while the other end 134 of the tethering device 130 is attached to the combine 120, such as to the underside side of the guard plate 140 as illustrated in FIG. 12 or on top of header platform as illustrated in FIG. 13.

In one embodiment, each symmetrical ear or anchor 70 comprises an arcuate crown 72 having opposite ends transitioning into hooked shaped sections or recessed sections 74, 76 terminating into the base 77 that, in turn, is attached to or integrally formed with the lower surface 22. Each symmetrical ear or anchor 70 further comprises a central hole 78 for receipt of an end of the tethering device 130.

Accordingly, an end of the tethering device 130 can be coupled to the respective hooked shaped sections or recessed sections 74, 76 and/or central hole 78. Examples of tethering devices 130 comprise, but are not limited to, bungee cords, straps, and wire.

Cross-Sections and Configurations

Figure 4:
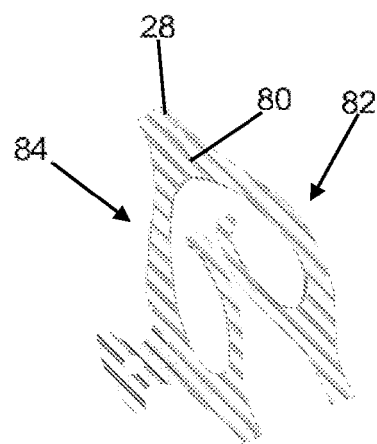
FIG. 4 is a lateral vertical sectional view of an embodiment of the combine harvester sickle safety guard apparatus.

Referring to FIG. 4, and in one embodiment, the combine harvester sickle safety guard apparatus 10 has substantially continuous or uninterrupted cross section 80 along its entire longitudinal and lateral lengths while general maintaining uniform vertical wall thickness.

The above does not mean that apparatus 10 is devoid of all manufacture inconsistences of the cross section.

Referring to FIG. 4, and in one embodiment, the longitudinally extending rib 28 of apparatus 10 laterally bifurcates into a pair of inwardly facing j-shaped longitudinal sidewall members 82, 84 comprising the pair of spaced apart outwardly arcuate longitudinal sidewall member portions 30, 32 (FIG. 3) defining interior channel 38 (FIG. 2) therebetween.

The longitudinally extending rib 28 joins the first longitudinal end portions of the longitudinal sidewall member portions 30, 32 that transition into second longitudinal end portions distal from the first longitudinal end portions and terminating to lowermost ribs 34, 36.

In turn, the outwardly arcuate longitudinal sidewall member portions 30, 32 respectively transition into the pair transversely or laterally inwardly turned spaced apart and facing longitudinal sidewall portions 40, 42 having arcuate shaped longitudinal faces 46, 48 radially or along the vertical axis inwardly decreasing in separation for defining a longitudinal opening 44 defining an arcuate sickle receiving area.

The arcuate shaped longitudinal faces 46, 48 are followed by respective pressure surfaces 50, 52 (FIG. 2) of the incurvate side wall portions 40, 42 defining the longitudinally and laterally extending slot 54 therebetween. Pressure surfaces 50, 52 arcuately transition from the guiding surfaces 46, 48 into short generally parallel runs followed by a vertically or radially outwardly increasing separation to interior terminating rounded ends 60, 62 disposed within the interior channel 38.

Alternate Embodiment

Figure 5:
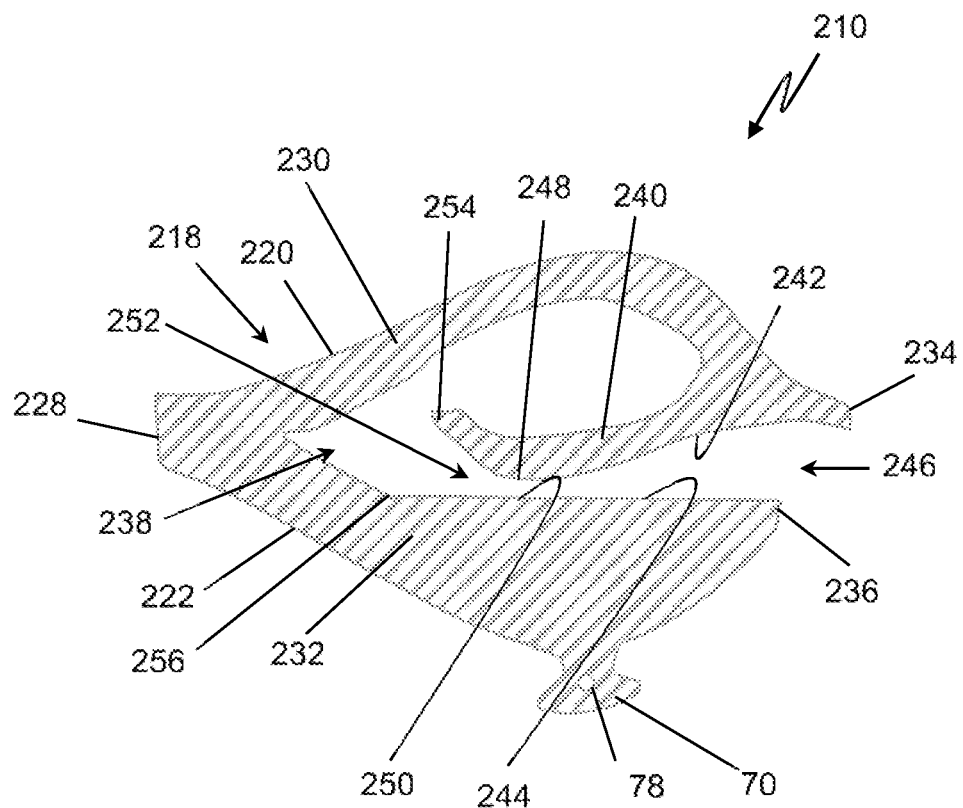
FIG. 5 is a lateral vertical sectional view of an alternative embodiment of the combine harvester sickle safety guard apparatus.

Referring to FIG. 5, and in another embodiment, a combine harvester sickle safety guard apparatus 210 comprises a substantially continuous or uninterrupted cross section 218 along its entire longitudinal and lateral lengths while general maintaining uniform vertical wall thickness.

Like apparatus 10, the above does not mean that apparatus 210 is devoid of all manufacture inconsistences of the cross section.

The combine harvester sickle safety guard apparatus 210 comprises an elongated rib 228 laterally bifurcating into a pair of spaced apart longitudinally and laterally extending side wall portions 220, 222. Side wall portion 220 comprises a first side wall portion 242 and a second generally planner side wall portion 244. The first side wall portion 242 respectively transitions into a distal, longitudinally and laterally extending, incurvate side wall portion 248. Accordingly, a longitudinally and laterally inwardly extending receiving gap 246 is formed between the opposing incurvate side wall portion 240 and the generally planner side wall portion 244.

The receiving gap 246 decreases in separation laterally inwardly for forming opposing guide surfaces 242, 244 laterally inwardly followed by opposing pressure surfaces 248, 250. Pressure surface 248 of the incurvate side wall portion 240 and pressure surface 250 of the generally planner side wall portion 232 define a longitudinally and laterally extending slot between the two sidewall portions 240 and 232 of the respective opposing pressure surfaces 248, 250 that comprises a short generally parallel run.

The pressure surface 248 radially inwardly increases in separation from pressure surface 250 to respective interior terminating ends 254, 256 disposed within the interior channel 238.

Sickle teeth of the combine harvester sickle are received and guided by the opposing guiding surfaces 242, 244 into the longitudinally and laterally extending slot 252 and into abutment with the opposing pressure surfaces 248, 250 while biasing apart the opposing pressure surfaces 248, 250 for providing a pressure fit between the opposing pressure surfaces 248, 250 and teeth of the sickle 122.

Analogous to apparatus 10, the combine harvester sickle safety guard apparatus 210 comprises a plurality of symmetrical ears or anchors 70 each comprising the arcuate crown 72 having opposite ends transitioning into hooked shaped sections or recessed sections 74, 76 terminating into the base 77 that, in turn, is attached to or integrally formed with the lower surface 221. Each symmetrical ear or anchor 70 further comprises a central hole 78 for receipt of an end of the tethering device 130.

Storage Unit

Figure 6:
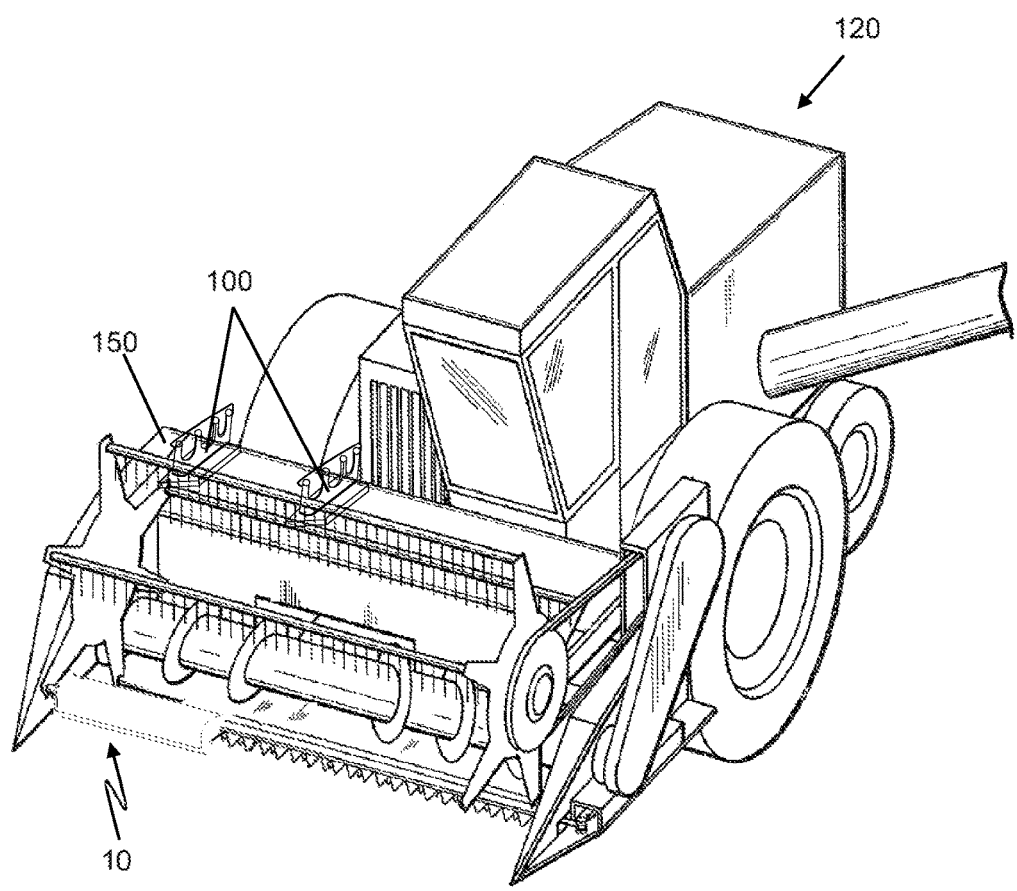
FIG. 6 is a simplified perspective view of an embodiment of a combine harvester having a pair of spaced apart harvester sickle safety guard apparatus storage units operatively coupled to and surmounting a header of the combine harvester for storing a plurality of harvester sickle safety guards one of which is illustrated operatively coupled to the sickle of the combine harvester.

FIG. 6 illustrates an embodiment of a storage unit assembly 100 for said combine harvester sickle safety guard apparatus 10 or 210.

Assembly 100 comprises a pair of spaced apart harvester sickle safety guard apparatus storage units 110 operatively coupled to and surmounting header 150 of the combine harvester for storing a plurality of harvester sickle safety guards one of which is illustrated operatively coupled to the sickle of the combine harvester.

Figure 7:
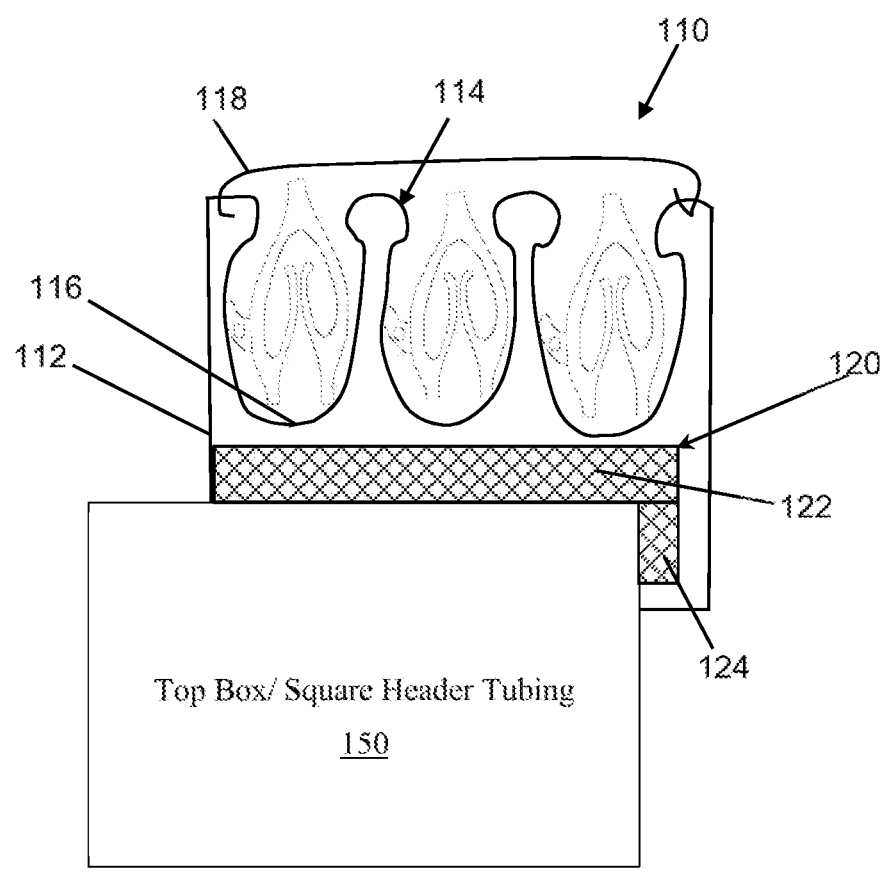
FIG. 7 is an elevational view of one of the pair of harvester sickle safety guard apparatus storage units.

FIG. 7 illustrates either one of the harvester sickle safety guard apparatus storage units 110 of the assembly 100.

Each storage unit 110 comprises a rectangular shaped base 112 surmounted by a rectangularly shaped crown section 114 having a continuous longitudinal crown shaped cross sectional area forming a plurality of guard holding channels 116 each complemental in shape to an end portion of the exterior surface of the combine harvester sickle safety guard apparatus 10 for storing a plurality of combine harvester sickle safety guard apparatus 10 therein and between the apparatus storage units 110.

Storage unit 110 also comprises an optional top tie down 118.

Furthermore, storage unit 100 comprises a notch 120 formed in a bottom surface thereof for forming a downwardly turned L-shaped bottom section with magnets 122, 124 respectively recessed within the long and short legs of the downwardly turned L-shaped bottom section formed in the bottom surface of the rectangular shaped base 112. In this form, the storage unit easily magnetically couples to the top box, or square heading tube 150.

Use and Operation

In use and operation, a user obtains at least one combine harvester sickle safety guard apparatus 10 from, for example, the storage unit 100 initially illustrated in FIG. 6.

Figure 8:
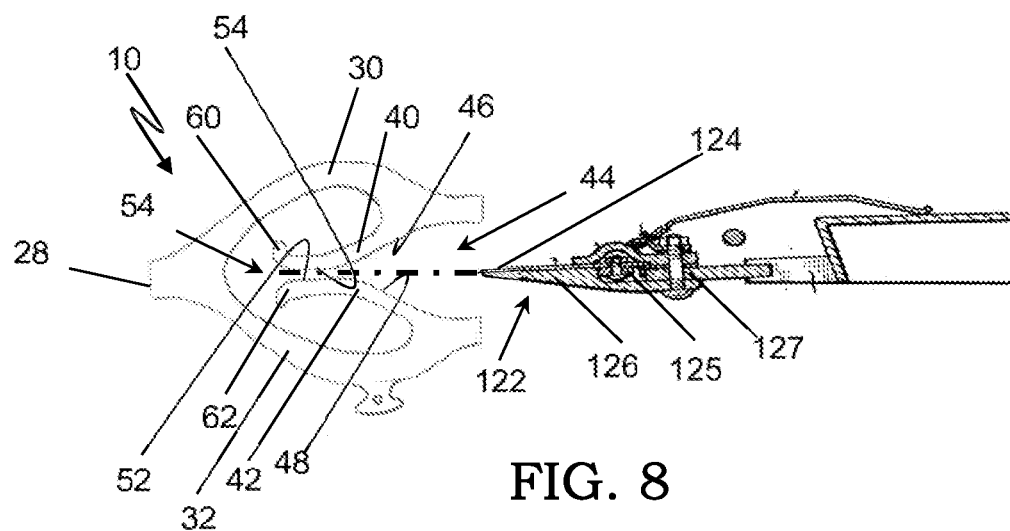
FIG. 8 is a forward end elevation view of an embodiment of the combine harvester sickle safety guard apparatus having a receiving area disposed adjacent a front of an embodiment of a combine harvester sickle illustrated in side section wherein the sickle comprises a first longitudinal array of a plurality of sickle teeth surmounting a second longitudinal array of a plurality of sickle teeth.

Referring to FIG. 8, the user then aligns the respective guiding surfaces 46, 48 above and below the sickle 122 having sickle teeth 124, 126 in which the apparatus 10 is being placed.

Figure 9:
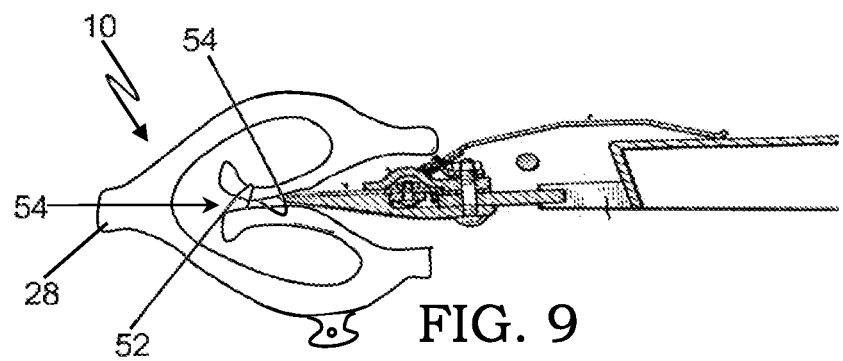
FIG. 9 is a forward end elevation view of an embodiment of the combine harvester sickle safety guard apparatus and the side section view of the combine harvester sickle of the combine in initial abutment with the combine harvester sickle safety guard apparatus.

Next, additional force is applied, preferably proximate to anterior rib 28 wherein sickle teeth 124, 126 of the respective sickle bars 125, 127 of the sickle 122 of combine harvester 120 (FIG. 10) are received and guided by the guiding surfaces 46, 48 into the longitudinally and laterally extending slot 54 and into abutment with the pressure, friction, or biasing surfaces 50, 52 as illustrated in FIG. 9.

Figure 10:
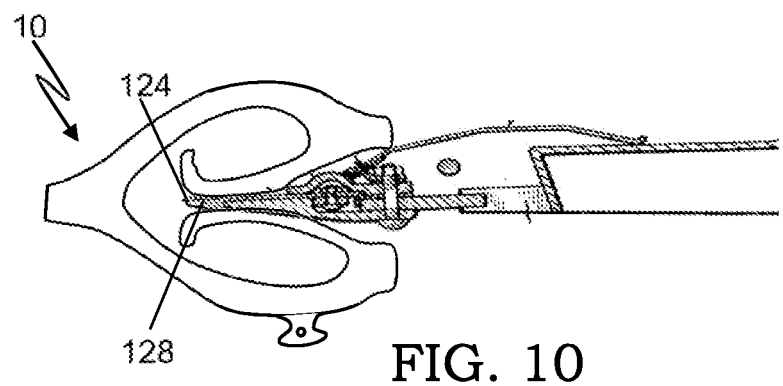
FIG. 10 is a forward end elevation view of an embodiment of the combine harvester sickle safety guard apparatus placed onto the sickle and the sickle teeth inserted into the combine harvester sickle safety guard apparatus.

Referring to FIG. 10, further user pressure urges, flexes, forces, or biases apart the pair of pressure, friction, or biasing surfaces 50, 52 for providing a pressure, friction, or biasing fit between the pressure surfaces 50, 52 and sickle teeth 124, 126 wherein the combine harvester sickle safety guard apparatus is pressure, friction, or bias fitted to the sickle bar teeth 124, 126 of the sickle 122 of the combine harvester 120 as illustrated in FIG. 10.

Figure 11:
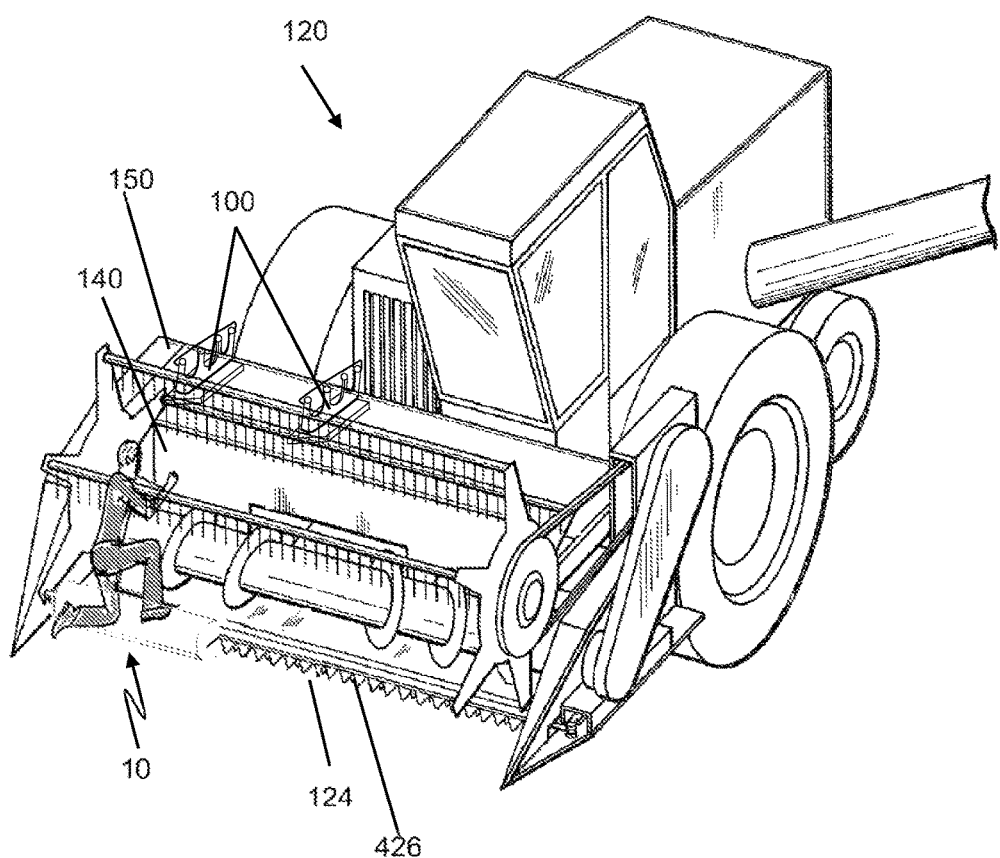
FIG. 11 is a simplified perspective view of a person utilizing an embodiment of the combine harvester sickle safety guard apparatus while working proximate the sickle of the combine harvester.

FIG. 11 illustrates a person utilizing an embodiment of the combine harvester sickle safety guard apparatus 10 while working proximate the sickle 122 of the combine harvester 120.

Referring to FIG. 12, the above coupling process of apparatus 10 to the sickle 122 having sickle teeth 124, 126 can be repeated as necessary to cover up to the entire length of sickle teeth 124, 126 of the combine harvester 120.

Additionally, and as illustrated in FIG. 13, the combine harvester sickle safety guard apparatus 10 can be further secured to the combine harvester 120 with the utilization of one or more tethering devices 130 tethered between anchors 70 on the combine harvester sickle safety guard apparatus 10 or 210 and to the combine 120, such as to the underside side of the guard plate 140.

Figure 14:
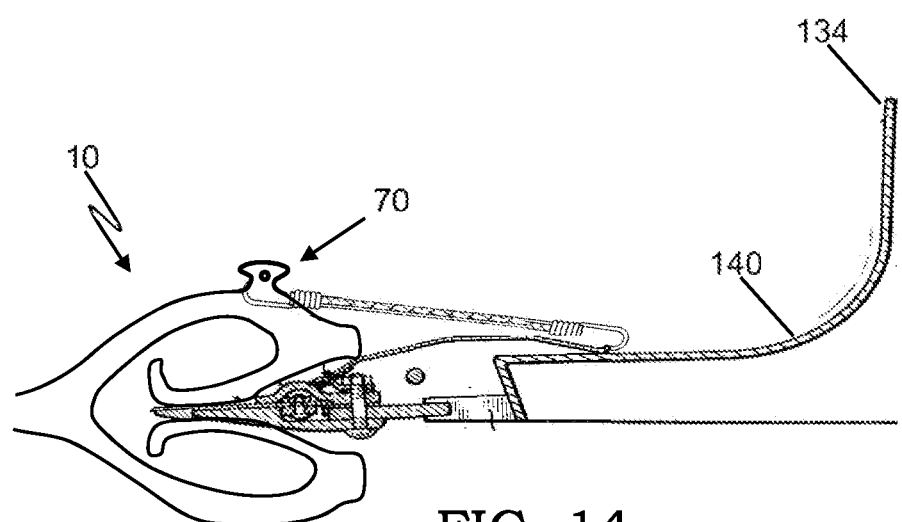
FIG. 14 is a forward end elevational view an embodiment of the combine harvester sickle safety guard apparatus illustrated rotated one-hundred-eighty degrees from that which is illustrated in FIG. 13 thereby superiorly positioning the ear or anchor such that that the combine harvester sickle safety guard apparatus is fastened on top of header platform.

FIG. 14 illustrates the combine harvester sickle safety guard apparatus rotated one-hundred-eighty degrees from that which is illustrated in FIG. 13 thereby superiorly positioning the ear or anchor 70 such that that the combine harvester sickle safety guard apparatus 10 can be fastened on top of header platform.

Accordingly, and in one aspect, the combine harvester sickle safety guard apparatus 10 is provided and easily utilized for protecting people working on or near these sickle teeth 124, 126 from being harmed by the injuriously sharp sickle teeth 124, 126 of the harvester sickle 122.

In another aspect, the combine harvester sickle safety guard apparatus 10 is provided and utilized for inhibiting equipment from damaging or being damaged by the sharp sickle teeth 124, 126 of the harvester sickle 122.

In a further aspect, the combine harvester sickle safety guard apparatus 10 can also be utilized on sickle or cutting bar arrangements found on a variety of machines and tools other than a combine harvester.

The combine harvester sickle safety guard apparatus 210 shares analogous use, operation, and aspects as apparatus 10.

Materials & Manufacturing Processes of Making

Furthermore, an embodiment of the combine harvester sickle safety guard apparatus 10 or 210 is formed from, but not limited to, Acrylonitrile butadiene styrene (ABS), a common thermoplastic polymer.

ABS is a terpolymer made by polymerizing styrene and acrylonitrile in the presence of polybutadiene. The proportions can vary from 15 to 35% acrylonitrile, 5 to 30% butadiene and 40 to 60% styrene. The result is a long chain of polybutadiene crisscrossed with shorter chains of poly (styrene-co-acrylonitrile).

The nitrile groups from neighboring chains, being polar, attract each other and bind the chains together, making ABS stronger than pure polystyrene. The styrene gives the plastic a shiny, impervious surface. The polybutadiene, a rubbery substance, provides resilience to apparatus 10 or 210 even at low temperatures.

The mechanical properties of ABS vary with temperature and are created by rubber toughening, where fine particles of elastomer are distributed throughout the rigid matrix.

Extrusion and Injection Molding

Moreover, ABS is light weight and has the ability to be extruded and injection molded.

In one embodiment, the combine harvester sickle safety guard apparatus 10 or 210 is formed by the process of, but not limited to, extrusion.

Accordingly, one or more desired materials from which apparatus 10 or 210 is being formed from are fed through a shape, such as one or more dies complemental in shape to the apparatus 10 or 210 to produce a long or oversized length having a constant cross-sectional shape along the whole long length for producing identical multiples of the combine harvester sickle safety guard apparatus 10 or 210, cut from the same long or oversized length having the same profile.

In another embodiment, the combine harvester sickle safety guard apparatus 10 or 210 is formed by the process of, but not limited to, injection molding.

In injection molding, the process of making the combine harvester sickle safety guard apparatus 10 or 210 typically comprises employing plastic pellet material from which apparatus 10 or 210 is being formed, feeding the plastic pellet material from a hopper into a heated cylinder, which contains a screw, wherein the screw carries the hot plastic, slowly melting it, and finally injecting it at high pressure into a series of gates and runners, which feed the plastic into a water-cooled steel mold.

Once the apparatus 10 or 210 has solidified under pressure, pins eject the finished combine harvester sickle safety guard apparatus 10 or 210 from the mold.

The above delineation of the combine harvester sickle safety guard apparatus 10 and 210, including use, operation, and aspects demonstrates the industrial applicability of this invention.

Moreover, it should be apparent that numerous modifications and adaptations may be resorted to without departing from the scope and fair meaning of the instant invention as set forth hereinabove and as described herein below by the claims.

We claim:

1. A sickle safety guard apparatus, comprising:
an elongated structural member comprising a pair of inwardly facing j-shaped longitudinal sidewall members, comprising:
a pair of spaced apart longitudinal sidewall portions defining an interior channel therebetween and having a pair of first longitudinal end portions and a pair of second longitudinal end portions distal from said pair of first longitudinal end portions;
a longitudinally extending rib joining said pair of first longitudinal end portions of said pair of spaced apart longitudinal sidewall portions;
a pair of facing arcuate longitudinal sidewall portions respectively transitioning from said pair of second longitudinal end portions of said pair of spaced apart longitudinal sidewall portions radially inwardly back toward said longitudinally extending rib;
said pair of facing arcuate longitudinal sidewall portions comprise a pair of facing arcuate shaped longitudinal faces radially inwardly decreasing in separation for defining a longitudinally and laterally extending receiving gap followed by a longitudinally and laterally extending receiving slot followed by said pair of facing arcuate shaped longitudinal faces transitioning into a pair of arcuate end portions increasing in separation by diverging until termination; and
wherein said pair of facing arcuate longitudinal sidewall portions are configured to flex upon receipt of sickle teeth into said receiving slot and abutment with said pair of facing arcuate longitudinal sidewall portions defining said receiving slot for providing a pressure fit between said pair of facing arcuate longitudinal sidewall portions defining said receiving slot and the sickle teeth.

2. The apparatus of claim 1 wherein said elongated structural member has a generally longitudinal oblong shape.

3. The apparatus of claim 2 wherein said elongated structural member has a substantially uninterrupted longitudinal, lateral, and vertical cross sectional area.

4. The apparatus of claim 3 further comprising a plurality of dual upwardly and downwardly turned hooked shaped ears disposed on a longitudinal exterior lower surface of said elongated structural member.

5. The apparatus of claim 4 wherein each of said plurality of dual upwardly and downwardly turned hooked shaped ears comprises a central hole extending therethrough.

6. The apparatus of claim 5 further comprising means for storing a plurality of said elongated structural members in a column and row matrix of complementary shaped holding channels.

7. A sickle safety guard apparatus, comprising:
a longitudinally extending rib having a longitudinally extending anterior face and a posterior portion;
a pair of spaced apart longitudinally and laterally extending side wall members integrally formed with and bifurcating from said posterior portion of said longitudinally extending rib, said pair of spaced apart longitudinally and laterally extending side wall members comprising:
a pair of arcuate, longitudinally and laterally extending, side wall member portions forming a longitudinally and laterally extending interior channel and comprising a pair of distal ends and a pair of proximate ends, said pair of proximate ends integrally formed with said posterior portion of said longitudinally extending rib; and
a pair of longitudinally and laterally extending flexible incurvate side wall member portions integrally formed with said pair of distal ends of said pair of arcuate, longitudinally and laterally extending, side wall member portions for forming a longitudinally and laterally extending receiving slot between said pair of longitudinally and laterally extending flexible incurvate side wall member portions; and
wherein said pair of longitudinally and laterally extending flexible incurvate side wall member portions are configured to flex radially outwardly away from one another when engaged by sickle teeth of a combine harvester sickle extending into said slot resulting in a return pressure being applied on either side of the received sickle teeth causing a resultant clamping action pressure by said pair of longitudinally and laterally extending flexible incurvate side wall member portions on the sickle teeth of the combine harvester sickle.

8. The apparatus of claim 7 wherein said longitudinally extending rib and said pair of arcuate, longitudinally and laterally extending, side wall member portions define a longitudinally extending body having a generally longitudinal oblong shape.

9. The apparatus of claim 8 wherein said longitudinally extending body has a substantially uninterrupted longitudinal, lateral, and vertical cross sectional area.

10. The apparatus of claim 9 further comprising a plurality of dual upwardly and downwardly turned hooked shaped ears disposed on a longitudinal exterior lower surface of said longitudinally extending body.

11. The apparatus of claim 10 wherein each of said plurality of dual upwardly and downwardly turned hooked shaped ears comprises a central hole extending therethrough.

12. The apparatus of claim 11 further comprising means for storing a plurality of said longitudinally extending bodies in an array of complementary shaped holding channels.

13. The apparatus of claim 12 wherein said storing means comprises a generally rectangularly shaped base surmounted by a generally rectangularly shaped crown section defining said array of complementary shaped holding channels.

14. A combine harvester sickle safety guard apparatus, comprising:
an elongated rib having a longitudinal axis, a lateral axis, and a vertical axis generally normal to one another;
said elongated rib longitudinally extending and laterally bifurcating into a pair of spaced apart longitudinally and laterally extending side wall portions having a pair of exterior arcuate surfaces and a pair of interior arcuate surfaces, said pair of interior arcuate surfaces defining a longitudinally and laterally extending interior channel;
said longitudinally and laterally extending side wall portions respectively transitioning into a pair of spaced apart, longitudinally and laterally inwardly extending, flexible incurvate side wall portions forming a longitudinally and laterally extending slot therebetween; and
said spaced apart, longitudinally and laterally inwardly extending, flexible incurvate side wall portions configured to flex vertically outwardly away from one another with receipt of sickle teeth within said longitudinally and laterally extending slot between said flexible incurvate side wall portions and with abutment of the sickle teeth on said flexible incurvate side wall portions wherein a resultant pressure is attained on either side of the received sickle teeth by said flexible incurvate side wall portions.

15. The apparatus of claim 14 wherein said elongated rib and said pair of spaced apart longitudinally and laterally extending side wall portions define a longitudinally extending body having a generally longitudinal oblong shape.

16. The apparatus of claim 15 wherein said longitudinally extending body has a substantially uninterrupted longitudinal, lateral, and vertical cross sectional area.

17. The apparatus of claim 16 further comprising a plurality of dual upwardly and downwardly turned hooked shaped ears disposed on a longitudinal exterior lower surface of said longitudinally extending body.

18. The apparatus of claim 17 wherein each of said plurality of dual upwardly and downwardly turned hooked shaped ears comprises a central hole extending therethrough.

19. The apparatus of claim 18 further comprising means for storing a plurality of said longitudinally extending bodies in an array of complementary shaped holding channels.

20. The apparatus of claim 19 wherein said storing means comprises a generally rectangularly shaped base surmounted by a generally rectangularly shaped crown section defining said array of complementary shaped holding channels.

\* \* \* \* \*